United States Patent
Stoimenov et al.

(10) Patent No.: US 10,030,709 B2
(45) Date of Patent: Jul. 24, 2018

(54) BEARING APPARATUS AND LUBRICATION UNIT

(71) Applicant: JTEKT CORPORATION, Osaka-shi, Osaka (JP)

(72) Inventors: Boyko Stoimenov, Kashiba (JP); Kiyoshi Tanimoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 70 days.

(21) Appl. No.: 15/204,352

(22) Filed: Jul. 7, 2016

(65) Prior Publication Data
US 2017/0016481 A1   Jan. 19, 2017

(30) Foreign Application Priority Data
Jul. 14, 2015   (JP) .................................. 2015-140468

(51) Int. Cl.
*F16C 33/66* (2006.01)
*F16C 19/16* (2006.01)

(52) U.S. Cl.
CPC ...... *F16C 33/6674* (2013.01); *F16C 33/6659* (2013.01); *F16C 33/6662* (2013.01); *F16C 19/163* (2013.01); *F16C 2240/02* (2013.01)

(58) Field of Classification Search
CPC .......................... F16C 19/163; F16C 33/6662; F16C 33/6676; F16C 2240/02; F16C 33/6629; F16C 33/6659
USPC ........ 384/462, 471–474, 465, 467; 184/6.28, 184/14, 26, 6.26, 15.3
See application file for complete search history.

(56) References Cited

U.S. PATENT DOCUMENTS

| | | | | |
|---|---|---|---|---|
| 5,116,145 A * | 5/1992 | Jan de Vries | ......... | F16C 19/386 384/465 |
| 5,368,582 A * | 11/1994 | Bertera | ................ | A61F 9/0008 347/1 |
| 7,293,919 B2 * | 11/2007 | Ueno | ................... | F04B 23/025 384/462 |
| 7,832,937 B2 * | 11/2010 | Suzuki | ................ | F16C 33/6674 184/11.2 |
| 8,403,110 B2 * | 3/2013 | Suzuki | ................ | B23Q 11/123 184/6.26 |
| 8,734,021 B2 * | 5/2014 | Suzuki | ................ | F16C 33/6674 384/473 |
| 2003/0099774 A1 * | 5/2003 | Morii | ..................... | C30L 37/00 427/335 |
| 2006/0165328 A1 | 7/2006 | Ueno et al. | | |

(Continued)

FOREIGN PATENT DOCUMENTS

DE   102012200777 A1 *   7/2013   ............... F16N 9/02
DE   102015111831 A1 *   1/2016   .......... F16C 33/6651

(Continued)

*Primary Examiner* — Marcus Charles
(74) *Attorney, Agent, or Firm* — Oliff PLC

(57) ABSTRACT

A bearing apparatus includes a bearing portion having an outer ring, an inner ring, a plurality of balls interposed between the outer ring and the inner ring, and a cage that holds the balls, and a lubrication unit provided adjacently to the bearing portion in an axial direction thereof to feed lubricant to a lubrication area that needs to be lubricated. The lubrication unit has a tank that stores the lubricant, and a pump that ejects the lubricant toward the lubrication area. The pump has an ejection port that is open toward the lubrication area and through which the lubricant is ejected at a predetermined initial velocity in the form of a 0.5 to 1,000 picoliter oil droplet.

7 Claims, 5 Drawing Sheets

(56) References Cited

U.S. PATENT DOCUMENTS

| | | | |
|---|---|---|---|
| 2008/0080801 A1 | 4/2008 | Suzuki et al. | |
| 2008/0112661 A1 | 5/2008 | Suzuki et al. | |
| 2008/0121465 A1 | 5/2008 | Suzuki et al. | |
| 2009/0148087 A1* | 6/2009 | Suzuki | F16C 33/3806 384/462 |
| 2013/0280039 A1* | 10/2013 | Pasteuning | F03D 11/0008 415/111 |
| 2014/0341490 A1* | 11/2014 | Ito | F16C 33/6607 384/471 |
| 2016/0025141 A1 | 1/2016 | Tanimoto | |

FOREIGN PATENT DOCUMENTS

| | | | |
|---|---|---|---|
| EP | 2037141 A1 * | 3/2009 | F16C 19/525 |
| JP | 2004-108388 A | 4/2004 | |
| JP | 2006-125540 A | 5/2006 | |
| JP | 2006-194402 A | 7/2006 | |
| JP | 2006-194406 A | 7/2006 | |
| JP | 2006-200740 A | 8/2006 | |
| JP | 2006-214470 A | 8/2006 | |
| JP | 2006-258192 A | 9/2006 | |
| JP | 2007-132486 A | 5/2007 | |
| JP | 2007-132487 A | 5/2007 | |
| JP | 2007-138963 A | 6/2007 | |
| JP | 2007-139036 A | 6/2007 | |
| JP | 2008-106900 A | 5/2008 | |
| JP | 4089363 B2 * | 5/2008 | F16C 33/66 |
| JP | 2014-152901 A | 8/2014 | |
| JP | 2014-152902 A | 8/2014 | |
| JP | 2014159853 A * | 9/2014 | |
| JP | 2016-023757 A | 2/2016 | |

* cited by examiner

AIR FLOWS

AIR FLOWS

BEARING APPARATUS AND LUBRICATION UNIT

INCORPORATION BY REFERENCE

The disclosure of Japanese Patent Application No. 2015-140468 filed on Jul. 14, 2015 including the specification, drawings and abstract, is incorporated herein by reference in its entirety.

BACKGROUND OF THE INVENTION

1. Field of the Invention

The invention relates to a bearing apparatus including a bearing portion and a lubrication unit that allows the bearing portion to be lubricated, and a lubrication unit provided in a rotating apparatus.

2. Description of the Related Art

In recent years, for a variety of machine tools, there has been a demand to allow a main spindle to operate at a higher speed in order to increase machining efficiency and productivity. When the main spindle rotates at high speed, particularly lubricity for a rolling bearing that supports the main spindle becomes a problem. Oil lubrication is known as means for keeping the rolling bearing lubricated and includes, for example, oil air lubrication, oil mist lubrication, and oil jet lubrication. However, these lubrication systems disadvantageously consume a very large amount of oil and thus increase running costs.

Thus, a bearing apparatus has been proposed in which a lubrication unit with a tank and a pump is assembled between an inner ring and an outer ring of a rolling bearing (see Japanese Patent Application Publication No. 2004-108388 (JP 2004-108388 A)). In the bearing apparatus, the lubrication unit is installed inside an axial extension portion of the outer ring of the rolling bearing. The rolling bearing (bearing portion) and the lubrication unit are integrated together. The lubrication unit includes the tank and the pump. The tank stores lubricant. The pump discharges the lubricant in the tank into an annular space between the inner ring and the outer ring. The pump has a needle-like nozzle protruding from a pump body. The pump discharges an approximately several microliter to several tens of nanoliter oil droplet through a tip of the nozzle. The oil droplet is fed to areas such as an inner-ring raceway surface and an outer-ring raceway surface to which the lubricant need to be supplied.

In the bearing apparatus with the lubrication unit assembled therein as described above, driving of the pump allows lubricant 91 to seep through an opening 90a at a nozzle tip 90 as depicted in FIG. 7A. When the amount of the seeping lubricant 91 increases, the lubricant is held at the nozzle tip 90 in the form of an approximately several microliter to several tens of nanoliter oil droplet as depicted in FIG. 7B. In the lubrication unit described in JP 2004-108388 A, the nozzle tip 90 is in proximity to balls 92 that are rolling elements. The oil droplet 91 held at the nozzle tip 90 are fed to a bearing interior through air flows occurring in the annular space between the inner ring and the outer ring as a result of rotation of the bearing.

However, in this case, the oil droplet 91 having left the nozzle tip 90 does not always reach the raceway surfaces, to which the lubricant needs to be supplied. For example, the oil droplet 91 may adhere to an outer surface of a cage that holds the rolling elements and fail to contribute to lubricating the rolling bearing. Thus, more lubricant (oil droplets) than needed may be discharged using the pump in order to provide for loss of the lubricant. However, the excess lubricant, which fails to contribute to lubrication, may increase rotating resistance (stirring resistance) to the rolling bearing.

In the bearing apparatus described in JP 2004-108388 A, the lubrication unit needs to be arranged in a space with a small volume, making an increase in the volume of the tank difficult. Thus, when the bearing apparatus is set to allow the pump to discharge a large amount of lubricant, consumption of the lubricant in the tank is increased, leading to the need to frequently refill the tank with lubricant. When the refilling with lubricant is frequently performed for maintenance, machine tools are shut down for each refilling, resulting in reduced production efficiency.

SUMMARY OF THE INVENTION

An object of the invention is to efficiently feed lubricant to areas that need to be lubricated to prevent excessive supply of the lubricant.

A bearing apparatus in an aspect of the invention includes a bearing portion having a fixed ring, a rotating ring that is coaxial with the fixed ring, a plurality of rolling elements interposed between the fixed ring and the rotating ring, and a cage that holds the rolling elements, and a lubrication unit provided adjacently to the bearing portion in its axial direction to feed lubricant to a lubrication area that needs to be lubricated. The lubrication unit has a tank that stores the lubricant, and a pump that ejects the lubricant toward the lubrication area. The pump has an ejection port that is open toward the lubrication area and through which the lubricant is ejected at a predetermined initial velocity in the form of a 0.5 to 1,000 picoliter oil droplet.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
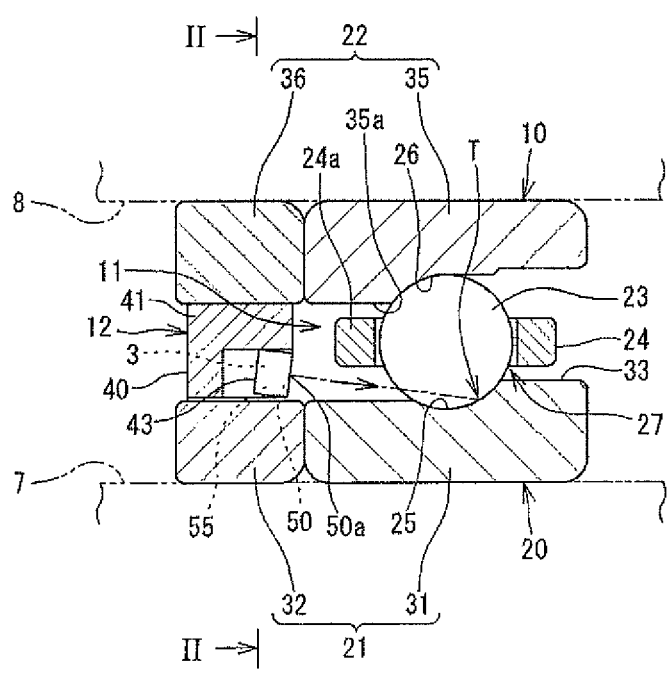
FIG. 1 is a sectional view depicting an embodiment of a bearing apparatus.

An embodiment of a bearing apparatus in the invention will be described below. FIG. 1 is a longitudinal sectional view depicting an embodiment of a bearing apparatus 10. The bearing apparatus 10 in the present embodiment supports a main spindle (shaft 7) of a main spindle apparatus provided in a machine tool so that the main spindle is rotatable. The bearing apparatus 10 is housed in a bearing housing 8 of the main spindle apparatus. In FIG. 1, the shaft 7 and the bearing housing 8 are depicted by long dashed double-short dashed lines. The bearing apparatus 10 includes a bearing portion 20 and a lubrication unit 40.

The bearing portion 20 has an inner ring 21, an outer ring 22, a plurality of balls (rolling elements) 23, and a cage 24 that holds the balls 23. In the present embodiment, the outer ring 22 is provided so as to be non-rotatable relative to the bearing housing 8, and is thus a fixed ring. The inner ring 21 rotates along with the shaft 7, and is thus a rotating ring.

The inner ring 21 is a cylindrical member externally fitted over the shaft 7, and has an inner-ring body portion 31 located on a first side in an axial direction (in FIG. 1, a right side) and an inner-ring extension portion 32 located on a second side in the axial direction (in FIG. 1, a left side). A raceway groove (hereinafter referred to as an inner-ring raceway groove 25) is formed on an outer periphery of the inner-ring body portion 31. In the present embodiment, the inner-ring body portion 31 and the inner-ring extension portion 32 are separate components. The inner-ring extension portion 32 functions as a spacer shaped like a short cylinder. Although not depicted in the drawings, the inner-ring body portion 31 and the inner-ring extension portion 32 may be integrated together (and may be inseparable).

The outer ring 22 is a cylindrical member fixed to an inner peripheral surface of the bearing housing 8. The outer ring 22 has an outer-ring body portion 35 located on the first side in the axial direction (in FIG. 1, the right side) and an outer-ring extension portion 36 located on the second side in the axial direction (in FIG. 1, the left side). A raceway groove (hereinafter referred to as an outer-ring raceway groove 26) is formed on an inner periphery of the outer-ring body portion 35. In the present embodiment, the outer-ring body portion 35 and the outer-ring extension portion 36 are separate components. The outer-ring extension portion 36 functions as a spacer shaped like a short cylinder. Although not depicted in the drawings, the outer-ring body portion 35 and the outer-ring extension portion 36 may be integrated together (and may be inseparable).

The balls 23 are interposed between the inner ring 21 (inner-ring body portion 31) and the outer ring 22 (outer-ring body portion 35) and roll on the inner-ring raceway groove 25 and the outer-ring raceway groove 26. The cage 24 is an annular member and has a plurality of pockets 27 formed along a circumferential direction. Each of the balls 23 is housed in a corresponding one of the pockets 27. Consequently, the cage 24 can hold the balls 23 in juxtaposition in a circumferential direction.

A first annular space 11 is formed between the inner-ring body portion 31 and the outer-ring body portion 35. A second annular space 12 is formed between the inner-ring extension portion 32 and the outer-ring extension portion 36. The first annular space 11 and the second annular space 12 are continuous with each other. The balls 23 and the cage 24 are provided in the first annular space 11. The lubrication unit 40 is provided in the second annular space 12.

In the present embodiment, the inner ring 21 rotates with respect to the outer ring 22 along with the shaft 7. The lubrication unit 40 is attached to an inner peripheral surface of the outer-ring extension portion 36 so as to be closely fitted to the inner peripheral surface. In contrast, a very small clearance is formed between an outer peripheral surface of the inner-ring extension portion 32 and an inner peripheral surface of the lubrication unit 40 so that the lubrication unit 40 does not hinder rotation of the inner ring 32.

Figure 2:
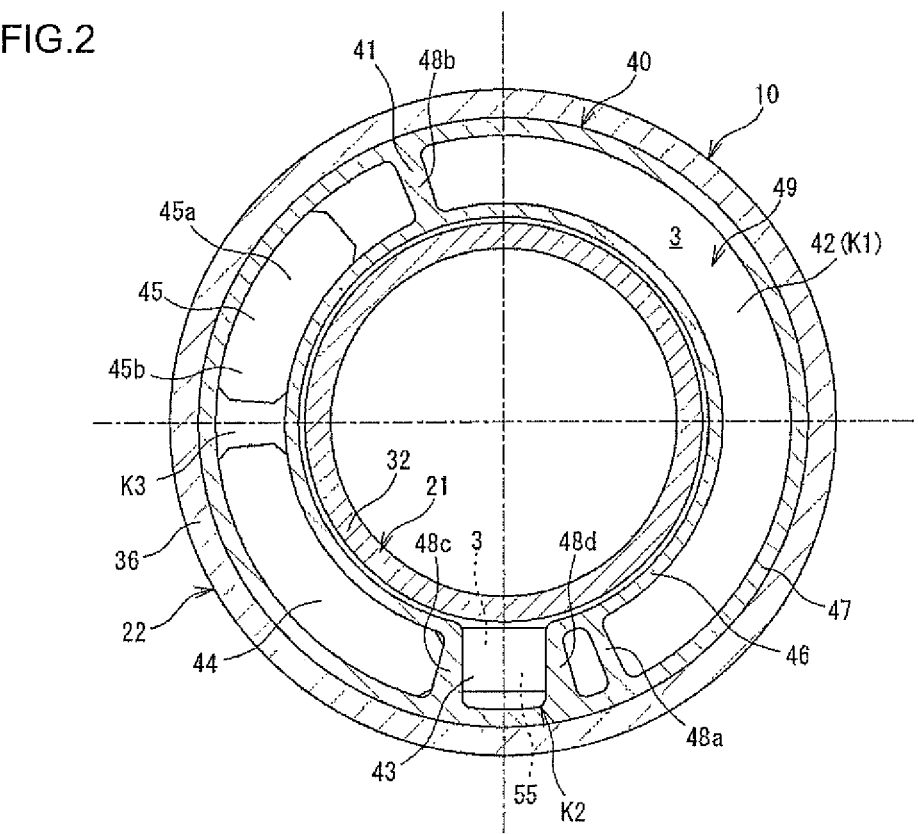
FIG. 2 is a sectional view taken along line II-II in FIG. 1.

FIG. 2 is a sectional view taken along line II-II in FIG. 1. The lubrication unit 40 is generally shaped like a circular ring. The lubrication unit 40 includes a holder 41, a tank 42, and a pump 43, and further includes a circuit portion 44 and a power supply portion 45.

The holder 41 is, for example, an annular member made of resin. The holder 41 has an inner wall 46 shaped like a short cylinder, an outer wall 47 shaped like a short cylinder, and a plurality of partition walls 48a, 48b, 48c, and 48d provided between the inner wall 46 and the outer wall 47. As depicted in FIG. 2, the walls define a plurality of spaces K1, K2, and K3 along the circumferential direction.

In the present embodiment, the first space K1 forms the tank 42, the pump 43 is stored in the second space K2, and the circuit portion 44 and the power supply portion 45 are stored in the third space K3. Thus, the lubrication unit 40 is integrally configured which includes the holder 41, the tank 42, the pump 43, the circuit portion 44, and the power supply portion 45. The lubrication unit 40 is attached to the outer-ring extension portion 36 so as to be integrated with the bearing portion 20. As depicted in FIG. 1, the lubrication unit 40 in the second annular space 12 is provided adjacently to the first annular space 11 in the axial direction.

In FIG. 2, the tank 42 stores lubricant 3, and has a storage portion 49 that stores the lubricant 3. The tank 42 is connected to the pump 43 through a channel in order to allow the lubricant 3 in the storage portion 49 to flow out to the pump 43. A retainer that retains the lubricant 3 (for example, felt or sponge) may be provided in the tank 42. Thus, the tank 42 stores the lubricant 3 and allows the lubricant 3 stored in the tank 42 to be fed to the pump 43. In FIG. 1, the pump 43 feeds (ejects) the lubricant 3 fed from the tank 42 into the first annular space 11. The pump 43 will further be described below.

In FIG. 2, the power supply portion 45 has a power generating portion 45a and a secondary battery portion 45b. The power generating portion 45a is enabled to generate power as a result of rotation of the inner ring 21 such that the power generated is stored in the secondary battery portion 45b. The circuit portion 44 is a circuit board including a programmed microcomputer and transmits a control signal (driving signal) to the pump 43. In other words, the circuit portion 44 applies driving power (applies a predetermined voltage) to the pump 43 (to a piezoelectric element 55 described below).

As described above, the lubrication unit 40 is provided adjacently to the bearing portion 20 in the axial direction to feed the lubricant to a lubrication area T (see FIG. 1) of the bearing portion 20 that needs to be lubricated. In the following description, the "lubrication area T" corresponds to the inner-ring raceway groove 25. A part of the cage 24 (in FIG. 1, a circular ring portion 24a on the left side of the cage 24) can come into slidable contact with a part 35a of an inner peripheral surface of the outer-ring body portion 35. Thus, the cage 24 is positioned in a radial direction, and the part 35a of the inner peripheral surface may correspond to the lubrication area.

The pump 43 of the lubrication unit 40 is configured to eject the lubricant 3 toward the lubrication area T. Thus, the pump 43 in the present embodiment internally has a piezoelectric element 55. The piezoelectric element 55 operates to vary the volume of the internal space in the pump 43 to allow the lubricant 3 in the internal space to be ejected through an ejection port 50.

Figure 7A:
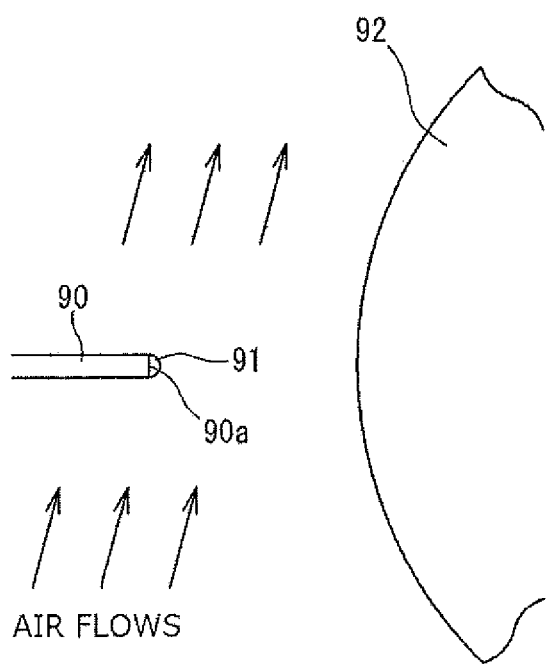
FIG. 7 is a diagram illustrating lubrication using a conventional pump.
Figure 7B:
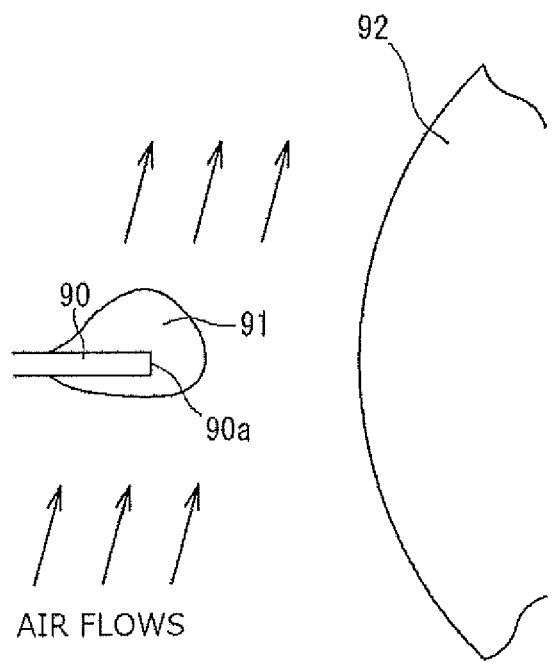

The pump 43 in the present embodiment has the ejection port 50 that is open toward the lubrication area T, to blow the lubricant 3 directly onto the lubrication area T. In this regard, the present embodiment is different from a technique in which lubricant (oil droplet 91) discharged through a nozzle 90 of a conventional pump (see FIG. 7B) is carried to an area that needs to be lubricated, through air flows occurring in a bearing interior. Thus, the pump 43 in the present embodiment ejects, based on the operation of the piezoelectric element 55, the lubricant 3 inside the pump 43 to the lubrication area T through the ejection port 50 at a predetermined initial velocity (flight velocity) in the form of an oil droplet. In the present embodiment, the ejection port 50 is set to have a very small opening area. Thus, the pump 43 ejects the lubricant 3 to the lubrication area T in the form of a 0.5 picoliter or more and 1000 picoliter or less oil droplet. An opening 50a of the ejection port 50 has a circular shape and preferably has a diameter (bore) of less than 100 micrometers, for example, 25 to 60 micrometers.

An operation in which the pump 43 ejects the lubricant 3 is controlled by the circuit portion 44 (see FIG. 2). The pump 43 is controlled to eject the lubricant 3 toward the lubrication area T in the form of an oil droplet. Consequently, the oil droplet ejected through the ejection port 50 has the predetermined initial velocity and can spurt through the ejection port 50 and impact the lubrication area T. As described above, a very small amount of lubricant of the order of picoliters per shot is ejected from the pump 43.

As depicted in FIG. 1, the opening 50a of the ejection port 50 is located away from the balls 23 and outside the first annular space 11 formed between the inner-ring body portion 31 and the outer-ring body portion 35. In the present embodiment, the opening 50a of the ejection port 50 is positioned within the second annular space 12 formed between the inner-ring extension portion 32 and the outer-ring extension portion 36.

Figure 3:
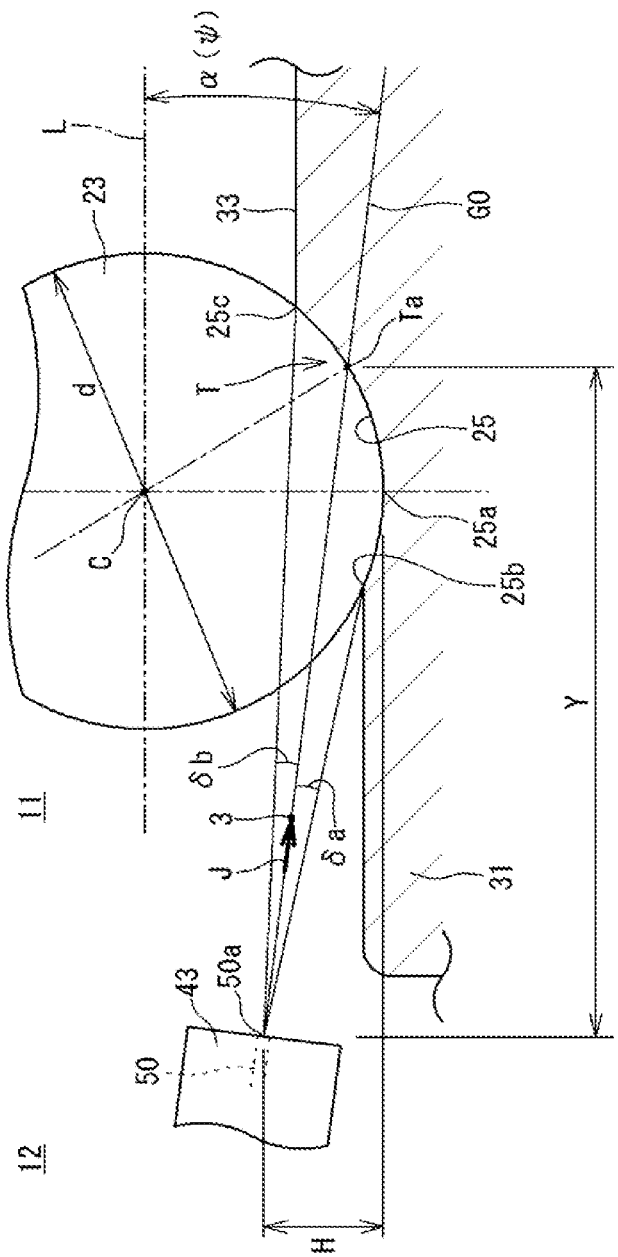
FIG. 3 is a diagram illustrating a pump and an inner-ring raceway groove.

FIG. 3 is a diagram illustrating the pump 43 and the inner-ring raceway groove 25. The ejection port 50 in the present embodiment is configured to eject an oil droplet (lubricant 3) along a center line direction J of the ejection port 50 (an opening direction of the opening 50a). The opening 50a of the ejection port 50 directed toward the lubrication area T allows the oil droplet ejected through the opening 50a to be fed directly to the lubrication area T. Thus, the center line direction J of the ejection port 50 is inclined to a virtual line L parallel to the center line of the bearing portion 20. In FIG. 3, the virtual line L is a line passing through a center C of the ball 23. The center line direction J of the ejection port 50 is inclined at an inclination angle α to the virtual line L.

In the bearing apparatus 10 configured as described above (see FIG. 1), the pump 43 of the lubrication unit 40 ejects the lubricant 3, in the form of an oil droplet, to the lubrication area T of the bearing portion 20 that needs to be lubricated. Thus, the lubricant 3 can be efficiently fed to the lubrication area T. This enables prevention of excessive supply of the lubricant 3 and an increase in stirring resistance offered by the lubricant 3. Consumption of the lubricant 3 is suppressed so that wasteful use of the lubricant 3 can be prevented. This enables extension of intervals between maintenance operations for refilling the tank 42 with the lubricant 3. As a result, a machine tool provided with the bearing apparatus 10 needs to be less frequently shut down for maintenance, suppressing a decrease in production efficiency. When an excess amount of the lubricant 3 is fed to the bearing portion 20, the lubricant 3 offers increased stirring resistance to rotation of the bearing. Then, temperature is elevated so that the lubricant 3 is more likely to be degraded. However, the present embodiment prevents the excessive supply of the lubricant 3 and thus an increase in stirring resistance, thereby suppressing degradation of the lubricant 3 resulting from an elevated temperature.

In the bearing apparatus 10 in the present embodiment, the lubricant 3 ejected toward the lubrication area T is in the form of a 0.5 to 1000 picoliter oil droplet. Consequently, the pump 43 needs to provide reduced power. If an attempt is made to eject the lubricant 3 directly to the lubrication area T at a predetermined initial velocity in the form of an approximately several microliter to several tens of nanoliter oil droplet, the pump 43 needs to provide high power. It is difficult to downsize the pump 43 providing high power to such a size that the pump 43 can be housed in the second annular space 12. In contrast, in the present embodiment, the lubricant 3 fed to the lubrication area T is in the form of a 1000 picoliter or less oil droplet. Therefore, the size of the pump 43 can be reduced, facilitating assembly of the pump 43 in the second annular space 12.

When the inner ring 21 rotates along with the shaft 7, air flows occur in the first annular space 11 in the same direction as a rotating direction of the balls 23 and the cage 24. Thus, in the present embodiment, the opening 50a of the ejection port 50 is positioned outside the first annular space 11. This makes the oil droplet ejected through the opening 50a less likely to be affected by the air flows occurring in the first annular space 11. Thus, the oil droplet can be fed directly to the target lubrication area T.

To allow the lubricant 3 to be ejected directly to the lubrication area T in the form of an oil droplet, the oil droplet (0.5 to 1000 picoliter oil droplet) ejected through the pump 43 need to have an increased flight velocity. Specifically, as depicted in FIG. 3, when an axial distance from the opening 50a of the ejection port 50 to a point Ta included in the lubrication area T is denoted as Y (meters), the oil droplet as ejected through the ejection port 50 has such an initial velocity V0 (meters/sec) has a value that is greater than or equal to 30 times the value of the axial distance Y. In the present embodiment, the initial velocity is set such that the value of the initial velocity V0 is equal to 400 times the value of the axial distance Y, which allows the oil droplet to more easily reach the lubrication area T. An upper limit on the initial velocity V0 (meters/sec) can be set such that, for example, the value of the initial velocity V0 is less than or equal to 500 times the value of the axial distance Y. Each of the balls comes into point contact with the inner-ring raceway groove 25, and thus, the point Ta included in the lubrication area T serves as a contact point on the inner-ring raceway groove 25 with which the ball 23 comes into contact. The bearing portion 20 in the present embodiment forms an angular ball bearing. The contact point (Ta) between the ball 23 and the inner-ring raceway groove 25 is positioned closer to a shoulder portion 33 of the inner-ring body portion 31 than a bottom point 25a of the inner-ring raceway groove 25.

Now, the position of the ejection port 50, the inclination angle α of the ejection port 50, and an ejection velocity (the initial velocity V0) of the oil droplet will be described. These values are set so as to allow the lubrication area T to be appropriately lubricated according to the size (bearing number) of the bearing portion 20. Thus, the bearing portion 20 will be described below which corresponds to an angular ball bearing in which the outer ring 22 (outer-ring body portion 35) has an outside diameter of 110 millimeters, the inner ring 21 (inner-ring body portion 31) has a bore diameter of 70 millimeters, the bearing portion 20 has an axial dimension (width dimension) of 20 millimeters, and each of the balls 23 has a contact angle of 20°.

The position of the opening 50a of the ejection port 50 in the axial direction lies in the second annular space 12, located away from the balls 23 as described above. When the bottom point 25a of the inner-ring raceway groove 25 is set to be a reference, the position of (the center of) the opening 50a in the radial direction lies between the reference and the center C of each of the balls 23. The position of the opening 50a in the radial direction will further be described. With the bottom point 25a set to be the reference, a radial dimension from the reference to the (center of) opening 50a, positioned outside the reference in the radial direction, is denoted as H. The diameter of each ball 23 is denoted as d. For the bearing portion 20, the radial dimension H can be set such that 0<H≤0.5×d, and in the present embodiment, the radial dimension is set such that H=0.22×d. The position of the opening 50a is set such that 0<H as described above. However, when a shoulder portion of the inner-ring body portion 31 that is closer to the pump 43 is higher than the bottom point 25a as depicted in FIG. 3, the opening 50a inevitably needs to be positioned so as to avoid overlapping the shoulder portion.

As described above, the center line direction J of the ejection port 50 is inclined at the inclination angle α to the virtual line L, which is parallel to the center line of the bearing portion 20 and which passes through the center of each ball 23. Specifically, the inclination angle α is set such that the center line direction J of the ejection port 50 coincides with a straight line G0 connecting the center of the opening 50a with the point Ta included in the lubrication area T (in other words, in the present embodiment, the contact point of the inner-ring raceway groove 25 with which each ball 23 comes into contact). That is, the inclination angle α is set equal to an angle formed between the virtual line L and the straight line G0 and denoted as ψ.

Deviations δa and δb for the inclination angle α are set because the inclination angle may be set to any value as long as the oil droplet can reach any position of the inner-ring raceway groove 25. The deviation δa is an angle formed between the straight line G0 serving as a reference and a straight line connecting the center of the opening 50a with an end 25b of the inner-ring raceway groove 25 that is closer to the pump 43. The deviation δb is an angle formed between the straight line G0 serving as the reference and a straight line connecting the center of the opening 50a with the end 25c of the inner-ring raceway groove 25 that is farther from the pump 43. Therefore, to allow the oil droplet ejected through the opening 50a to impact the inner-ring raceway groove 25, the inclination angle α of the center line direction J of the ejection port 50 to the virtual line L may be set as follows.

(Angle ψ−deviation δb)≤(inclination angle α)≤(angle ψ+δa)

The thus set range of the inclination angle may correspond to the lubrication area T. In other words, the entire area of the inner-ring raceway groove 25 may correspond to the lubrication area T.

Figure 4A:
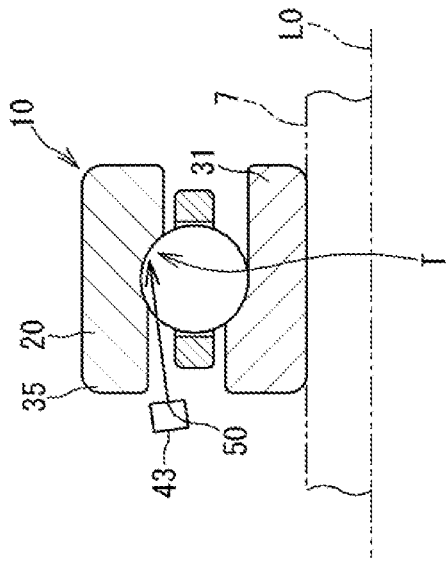
FIGS. 4A to 4D are diagrams each illustrating a form in which the bearing apparatus is applied.
Figure 4B:
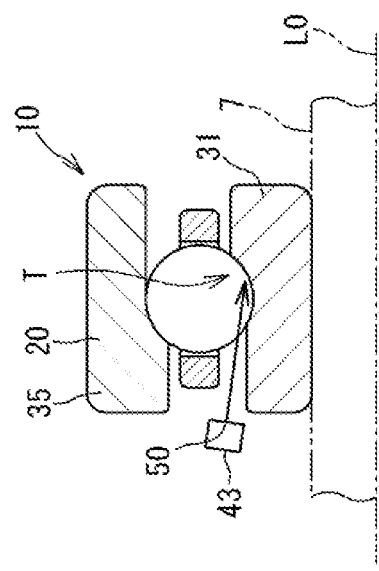
Figure 4C:
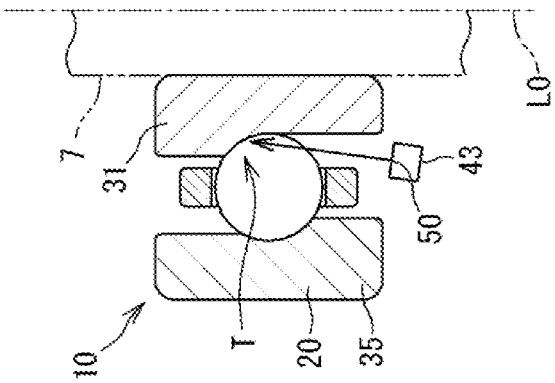
Figure 4D:
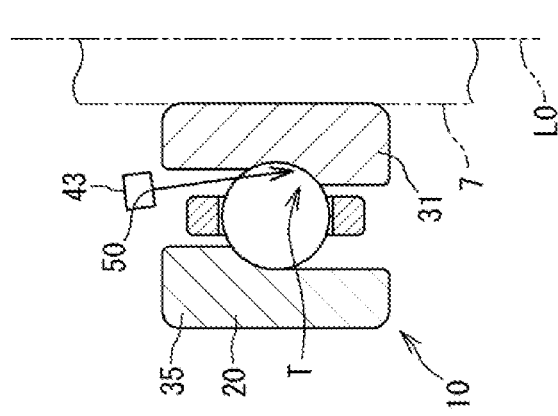

The initial velocity V0 at which the oil droplet is ejected through the ejection port 50 is set as follows. The bearing apparatus 10 is used in four typical forms depicted in FIGS. 4A, 4B, 4C, and 4D. FIG. 4A illustrates that the direction of the center line L0 (axial direction) of the bearing portion 20 coincides with the horizontal direction and that the lubrication area T is positioned below the ejection port 50. FIG. 4B illustrates that the direction of the center line L0 (axial direction) of the bearing portion 20 coincides with the horizontal direction and that the lubrication area T is positioned above the ejection port 50. FIG. 4C illustrates that the direction of the center line L0 (axial direction) of the bearing portion 20 coincides with the vertical direction and that the lubrication area T is positioned below the ejection port 50. FIG. 4D illustrates that the direction of the center line L0 (axial direction) of the bearing portion 20 coincides with the vertical direction and that the lubrication area T is positioned above the ejection port 50.

The initial velocity V0 is set such that, regardless of in whichever of the four forms the bearing apparatus 10 is arranged, the lubricant 3 ejected through the ejection port 50 in the form of an oil droplet can reach the lubrication area T, that is, the inner-ring raceway groove 25. This will be specifically described. For the bearing portion 20 that is an angular ball bearing (with an axial dimension of 20 millimeters) according to the present embodiment, the deviation δa on one side and the deviation δb on the other side with reference to the straight line G0 (see FIG. 3) have been described. The smaller of the two deviations (in the present embodiment, δb) is defined as a deviation δ for the inclination angle α in the bearing portion 20 (δ=δb). The deviation δ is calculated to be 2.3° based on geometric shapes.

Figure 5:
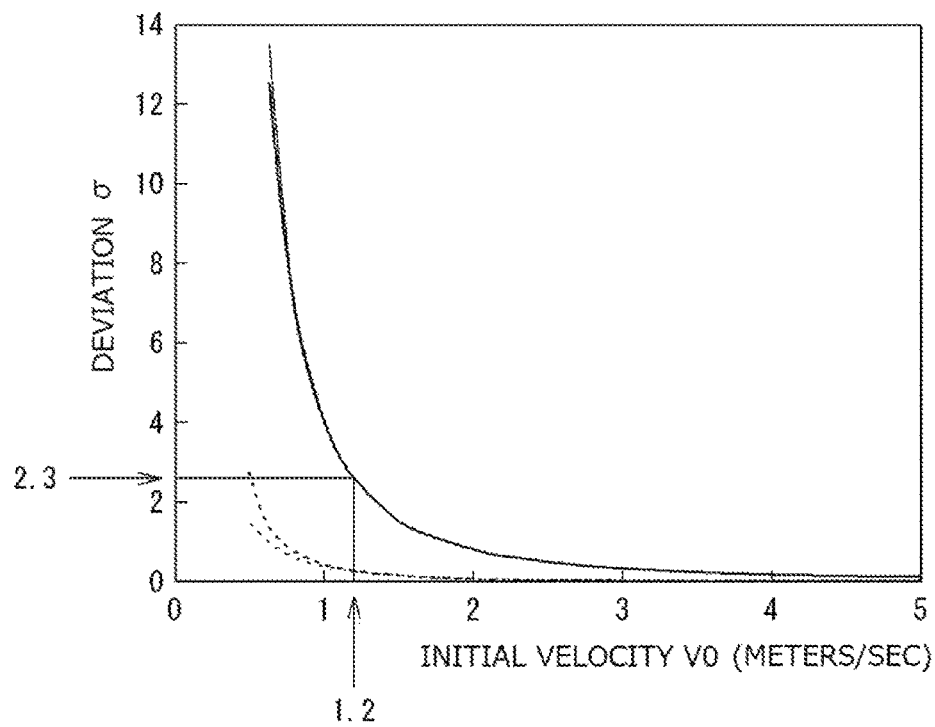
FIG. 5 is a graph illustrating an initial velocity of an oil droplet and deviation of an inclination angle $\alpha$.

FIG. 5 is a graph illustrating the initial velocity V0 of the oil droplet (the axis of abscissas) and the deviation δ for the inclination angle α with reference to the straight line G0 (the axis of ordinate) in each of the four forms depicted in FIGS. 4A, 4B, 4C, and 4D. The graph indicates results of simulation. In the graph illustrated in FIG. 5, a "thick continuous line" represents the form in FIG. 4A, a "thin continuous line" represents the form in FIG. 4B, a "thick dashed line" represents the form in FIG. 4C, and a "thin dashed line" represents the form in FIG. 4D.

As illustrated in FIG. 5, the initial velocity V0 at which the deviation δ is 2.3° or less in all of the four forms is 1.2 meters/sec or more. That is, when the lubricant 3 is ejected through the ejection port 50 at an initial velocity V0 of 1.2 meters/sec or more in the form of an oil droplet, the oil droplet can be attached to the lubrication area T, i.e., the inner-ring raceway groove 25, regardless of the orientation in which the bearing apparatus 1 including the bearing portion 20 is used.

Figure 6:
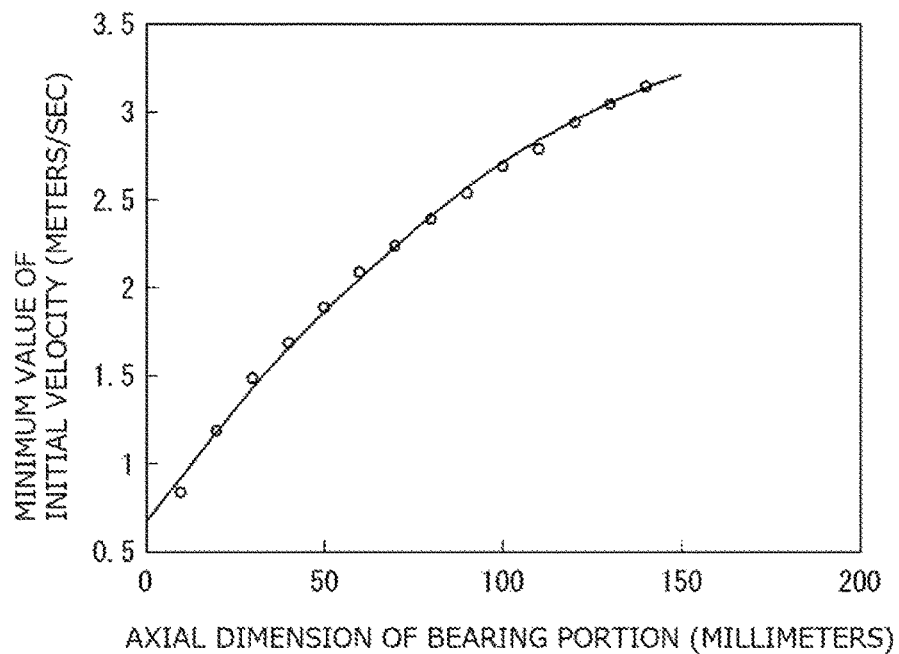
FIG. 6 is a graph illustrating a relationship between a minimum value of the initial velocity of the oil droplet and an axial dimension of a bearing portion.

FIG. 6 is a graph illustrating a relationship between the minimum value of the initial velocity V0 of the oil droplet and the axial dimension (width) of the bearing portion 20. The minimum value in the graph is the minimum value of the initial velocity V0 of the oil droplet that allows the oil droplet to reach the inner-ring raceway groove 25 regardless of to whichever of the forms depicted in FIGS. 4A to 4D the bearing apparatus 1 is applied. For example, when the bearing portion 20 included in the bearing apparatus 1 has an axial dimension (width) of 5 mm, the initial velocity V0 has a minimum value of 0.6 meters/sec. When the bearing portion 20 has an axial dimension (width) of 150 mm, the initial velocity V0 has a minimum value of 3.3 meters/sec. As depicted in FIG. 6, an increased axial dimension (width) of the bearing portion 20 results in increase in the needed initial velocity V0 of the oil droplet. As described above, the initial velocity V0 can be set based on the size (particularly the axial dimension) of the bearing portion 20 and the size of the lubrication area T.

As described above, in the bearing apparatus 1 in the present embodiment, the lubricant 3 is ejected from the pump 43 of the lubrication unit 40 toward the lubrication area T in the form of an oil droplet of a picoliter size and also at an increased flight velocity. Thus, the lubricant 3 can be efficiently fed to the lubrication area T, preventing excessive supply of the lubricant 3 to suppress consumption of the lubricant. Thus, the lubricant 3 in the tank can be prevented from being wastefully used.

In the above-described embodiment, the bearing apparatus 10 is provided with the bearing portion 20 and the lubrication unit 40. However, the lubrication unit 40 may be applied to rotating apparatuses other than machine tools. For example, the lubrication unit 40 may be an apparatus configured to lubricate a gear tooth surface of a gear mechanism. In other words, although not depicted in the drawings, the lubrication unit may be an apparatus provided in a rotating apparatus such as a gear mechanism to feed lubricant to a lubrication area of the rotating apparatus that needs to be lubricated. Also in this case, the lubrication unit has a tank that stores lubricant and a pump that ejects the lubricant to the lubrication area. The pump has an ejection port that is open toward the lubrication area. The pump is configured to eject the lubricant to the lubrication area through the ejection port at a predetermined initial velocity (flight velocity) in the form of a 0.5 to 1000 picoliter oil droplet.

The embodiment described above is illustrative in all respects and is not restrictive. That is, the bearing apparatus (lubrication unit 40) in the invention is not limited to the illustrated forms but may be in any other form within the scope of the invention. In the above-described embodiment, the bearing portion 20 is an angular ball bearing. However, the form of the bearing is not limited to this. A deep groove ball bearing may be used or a tapered roller bearing or a cylindrical roller bearing may be used.

In the above-described embodiment, the inner ring 21 is a rotating ring. However, the outer ring 22 may be rotating ring, and the inner ring 21 may be a fixed ring. In this case, the lubrication unit 40 may be attached to the inner-ring extension portion of the fixed ring.

In the invention, the pump ejects the lubricant to the lubrication area that needs to be lubricated, in the form of an oil droplet. Thus, the lubricant can be efficiently fed to the lubrication area, enabling prevention of excessive supply of the lubricant.

What is claimed is:

1. A bearing apparatus comprising:
   a bearing portion having a fixed ring, a rotating ring that is coaxial with the fixed ring, a plurality of rolling elements interposed between the fixed ring and the rotating ring, and a cage that holds the rolling elements; and
   a lubrication unit provided adjacently to the bearing portion in its axial direction to feed lubricant to a lubrication area that needs to be lubricated, wherein
   the lubrication unit has a tank that stores the lubricant, and a pump that ejects the lubricant toward the lubrication area,
   the pump has an ejection port with an opening toward the lubrication area and through which the lubricant is ejected at a predetermined initial velocity in the form of a 0.5 to 1,000 picoliter oil droplet, and
   the opening directed toward the lubrication area allows the oil droplet to be ejected from the opening through a space of the bearing portion and fed directly to the lubrication area.

2. The bearing apparatus according to claim 1, wherein the opening of the ejection port is positioned out of an annular space formed between the fixed ring and the rotating ring.

3. The bearing apparatus according to claim 2, wherein the opening of the ejection port has a circular shape and a diameter of less than 1000 micrometers.

4. The bearing apparatus according to claim 2, wherein a center line direction of the ejection port is inclined relative to a virtual line parallel to a center line of the bearing portion.

5. The bearing apparatus according to claim 1, wherein the opening of the ejection port has a circular shape and a diameter of less than 1000 micrometers.

6. The bearing apparatus according to claim 1, wherein a center line direction of the ejection port is inclined relative to a virtual line parallel to a center line of the bearing portion.

7. A lubrication unit provided in a rotating apparatus to feed lubricant to a lubrication area of the rotating apparatus, which needs to be lubricated, the lubrication unit comprising:
   a tank that stores the lubricant and a pump that ejects the lubricant toward the lubrication area, wherein
   the pump has an ejection port with an opening toward the lubrication area and through which the lubricant is ejected to the lubrication area at a predetermined initial velocity in the form of a 0.5 to 1000 picoliter oil droplet, and
   the opening directed toward the lubrication area allows the oil droplet to be ejected from the opening through a space of the bearing portion and fed directly to the lubrication area.

* * * * *